(12) United States Patent
Seince et al.

(10) Patent No.: US 10,981,247 B2
(45) Date of Patent: Apr. 20, 2021

(54) DEVICE FOR ADDITIVE MANUFACTURING OF A TURBOMACHINERY PART BY DIRECT METAL DEPOSITION ONTO A SUBSTRATE

(71) Applicant: SAFRAN AIRCRAFT ENGINES, Paris (FR)

(72) Inventors: Hervé Antoine Frédéric Seince, Samoreau (FR); Sébastien Yohann Pouzet, Avon (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 284 days.

(21) Appl. No.: 15/925,291

(22) Filed: Mar. 19, 2018

(65) Prior Publication Data
US 2018/0281115 A1 Oct. 4, 2018

(30) Foreign Application Priority Data

Mar. 28, 2017 (FR) ...................................... 1752564

(51) Int. Cl.
*B23K 9/32* (2006.01)
*B23K 26/342* (2014.01)
(Continued)

(52) U.S. Cl.
CPC .......... *B23K 26/342* (2015.10); *B22F 3/1055* (2013.01); *B23K 26/10* (2013.01);
(Continued)

(58) Field of Classification Search
CPC ................ B22F 2999/00; B22F 3/1055; B22F 2003/1056; B22F 2202/05; B22F 2203/11;
(Continued)

(56) References Cited

U.S. PATENT DOCUMENTS

| 4,927,992 A | 5/1990 | Whitlow et al. |
| 6,011,240 A * | 1/2000 | Bishop .................. B23K 26/26 219/121.63 |

(Continued)

FOREIGN PATENT DOCUMENTS

| CN | 205661045 U | 10/2016 |
| EP | 2975351 A1 | 1/2016 |

OTHER PUBLICATIONS

Rapport de Recherche Préliminaire / Opinion Écrite sur la Brevetabilité de l'Invention, dated Dec. 8, 2017, issued in corresponding French Application No. 1752564, filed Mar. 28, 2017, 8 pages.

*Primary Examiner* — Sang Y Paik
(74) *Attorney, Agent, or Firm* — Christensen O'Connor Johnson Kindness PLLC

(57) ABSTRACT

A device for the additive manufacturing of a turbomachinery part by direct metal deposition onto a substrate comprising: a source of metallic material; a source of energy configured to produce molten metal from the metallic material produced from the source of metallic material; a substrate; a mold arranged on the substrate and equipped with at least one opening, in order to allow a localized deposition of molten metal onto the substrate, the mold comprising a magnetic material; and a substrate support arranged under the substrate, the support being configured to generate an electromagnetic force allowing the mold to be drawn towards the substrate.

15 Claims, 3 Drawing Sheets

(51) Int. Cl.
- *B23K 26/70* (2014.01)
- *B23K 26/10* (2006.01)
- *B33Y 30/00* (2015.01)
- *F01D 9/04* (2006.01)
- *F01D 19/02* (2006.01)
- *F01D 25/28* (2006.01)
- *F01D 25/24* (2006.01)
- *B22F 3/105* (2006.01)
- *B29C 64/245* (2017.01)
- *B33Y 10/00* (2015.01)

(52) U.S. Cl.
CPC .......... *B23K 26/703* (2015.10); *B29C 64/245* (2017.08); *B33Y 30/00* (2014.12); *F01D 9/04* (2013.01); *F01D 19/02* (2013.01); *F01D 25/24* (2013.01); *F01D 25/28* (2013.01); *B22F 2003/1056* (2013.01); *B22F 2999/00* (2013.01); *B33Y 10/00* (2014.12); *F05D 2230/31* (2013.01); *Y02P 10/25* (2015.11)

(58) Field of Classification Search
CPC ...... B22F 2207/15; B22F 5/009; B22F 5/106; B23K 26/10; B23K 26/342; B23K 26/703; B29C 64/245; B33Y 10/00; B33Y 30/00; F01D 19/02; F01D 25/24; F01D 25/28; F01D 9/04; F05D 2230/31; Y02P 10/295
USPC ...................... 219/76.1–76.12, 121.6–121.66
See application file for complete search history.

(56) References Cited

U.S. PATENT DOCUMENTS

| | | |
|---|---|---|
| 2005/0173380 A1 | 8/2005 | Carbone |
| 2007/0023977 A1 | 2/2007 | Braun et al. |
| 2015/0298259 A1 | 10/2015 | Colin et al. |
| 2015/0298376 A1* | 10/2015 | Tozawa ............... B29C 45/1742 264/39 |
| 2018/0221958 A1* | 8/2018 | Torun ..................... F01D 25/24 |

\* cited by examiner

DEVICE FOR ADDITIVE MANUFACTURING OF A TURBOMACHINERY PART BY DIRECT METAL DEPOSITION ONTO A SUBSTRATE

TECHNICAL FIELD

Embodiments of the present disclosure relate to the additive manufacturing of turbomachinery parts, such as, for example, the casing of turbomachines, from a substrate. Embodiments of the disclosure also more specifically relate to the additive manufacturing of type direct metal deposition, by laser melting or electron beam. Embodiments of the disclosure specifically relate to a device for the additive manufacturing of a turbomachinery part by direct metal deposition onto a substrate, as well as a method for additive manufacturing in order to implement the device.

BACKGROUND

Direct metal deposition, also known as DMD, is an additive manufacturing technology. The principle behind this technology is based on the supply of material (in the form of a wire or powder) into a melt pool, created by an energy source (a laser or an electron beam) on the surface of a substrate.

Different DMD techniques are conceivable. When the energy source is a laser, Laser Metal Deposition, known as LMD, creates a melt pool on the surface of a substrate, by a material supply in the form of powder. A variation, the $LMD_w$, or Laser Metal Deposition wire, creates a melt pool on the surface of a substrate, by a material supply in the form of a welding wire.

When the energy source is an electron beam, the deposition is referred to as Electron Beam Metal Deposition, known as EBMD. A melt pool is created on the surface of a substrate, by a material supply in the form of a welding wire.

An example of direct metal deposition, of type LMD, will now be illustrated in connection with FIGS. 1 and 2.

A first layer 10 of material is formed by projection of powder particles of this material through a tube 190 onto a support 80, under localized protection or in a chamber under overpressure or in depression regulated by inert gas. This tube 190 produces, simultaneously to the projection of powder particles 60, a laser beam 95 which comes from a generator 90. The first opening 191 of the tube 190 from which the powder is projected onto the support 80 is coaxial to the second opening 192 through which the laser beam 95 is emitted, in such a way that the powder is projected into the laser beam 95. The powder forms a cone of particles, this cone being hollow and of a certain thickness (beam of powder 94 in FIG. 2), and the laser beam 95 is conical.

The work plane P is defined as being the plane including the surface on which the layer is in construction/in formation.

For the construction of the first layer, this surface is the upper (free) face $S_o$ of the support 80. For the construction of the [n+1]-th layer, this surface is the upper (free) face of the [n]-th layer (with n-integer, n≥1).

The laser beam 95 forms a pool 102 on the support 80 by melting the area of the support 80 exposed to the laser beam. The powder supplies the pool 102 in which it reaches a liquid state, the powder having been melted during its passage into the laser beam before reaching the pool.

Alternatively, the tube 190 and the focal point of the laser can be regulated and/or positioned in such a way that the powder of given distribution of sizes, does not, for example, pass into the laser beam 95 for a long enough time that the entirety of its different-sized particles are entirely melted, and melt on arriving in the pool 102 already formed on the surface of the support 80 by melting of the area of the support 80 exposed to the laser beam 95.

The working distance WD is defined as the distance between the exit of the tube 190 and the work plane P.

Over the considered working distance WD, the powder can also not be melted by the laser beam 95 or only be partially melted because the size of some or all of the particles making up the powder is too great for them to be melted.

In all cases, the powder particles are heated during their passage into the laser beam 95 before supplying the pool.

Whereas the laser beam 95 (or the support 80) moves according to a predetermined direction, the pool 102 is maintained and solidifies bit by bit to form a band of solidified material 105 on the support 80. The process continues to form another solidified band on the support 80, this other band being, for example, placed next to the first band. Thus, by movement of the tube 190 or the support 80 in a plane parallel to the previous work plane P, a first layer 10 of material is built up on the support 80, which forms a first independent element 15 on solidifying.

A second sweep of the tube 190 and the laser beam 95 is carried out in order to form a second layer 20 of material on top of the first element 15, in a similar way. This second layer 20 forms a second fortified element 25, the two elements 15 and 25 forming an independent unit. The pools 102 formed on the first element 15 during the construction of this second layer 20 in general comprise at least one section of the first element 15 which has been melted through exposure to the laser beam, and the powder particles supply the pools 102.

This process of producing the part layer by layer continues by adding additional layers on top of the assembly which has already been formed.

FIG. 2, which represents the prior art, shows the configuration of the laser beam 95 and the powder beam 94 in greater detail. The laser beam 95 exits the tube 190 diverging from its focal point $F_L$ (situated in a lower section of the tube 190) at an angle 2β and illuminates an area of the support 80 to help to form a pool 102 there.

The powder beam 94 exits the tube 190 converging, according to an angle 2δ, towards its focal point Fp which is situated within the laser beam 95 and just on (or above) the surface of the support 80 (work plane P), in such a way that the powder particles 60 pass into the laser beam 95 for the maximum amount to be heated. The advantage of a significant laser/powder interaction upstream of the pool is the simultaneous production of a high rate of deposition and a small dilution, both of which are frequently sought in repair welding (surface repairs of used parts) and coating hard deposits, Over the course of the piece-by-piece construction process of the part, the tube 190 notably moves vertically, and by keeping the distance constant between points $F_L$ and $F_P$ (that is to say Défoc$_L$–Défoc$_P$=constant), where Défoc$_L$ and Défoc$_P$ respectively represent the defocusing of the laser and of the powder as defined by Défoc$_L$={distance between point $F_L$ and work plane P} and Défoc$_P$={distance between point $F_P$ and work plane P} and visible in FIG. 2).

Thus, the focal point $F_P$ of the powder beam 94 remains within the laser beam 95 and just on (or above) the surface of the previously constructed layer (work plane P).

Thus, there is a defocused laser beam (Défoc$_L$>0) and a focused powder beam (Défoc$_P$=0) on the plane P or defocused (Défoc$_P$>0) above the plane P, and the two angles 2β and 2δ must be configured so that on the one hand the working distance WD between the exit of the tube and this plane P is large enough to avoid the deterioration of the base of the tube by the radiation of the pool and on the other hand to keep the opening of the laser beam at the exit of the tube smaller than the diameter of the internal cone.

The movement of the support 80 or the sweep of the tube/laser beam 95 assembly allows each layer to be given a form independent from the adjacent layers. The lower layers of the part are re-fired and re-cooled so that the upper layers of the part are formed.

These methods for direct manufacture of a part by projecting powder or wire form themselves as distortions on the substrate due to the dispersion of heat made difficult during the melting. The amount of energy applied locally being very high, its dispersion is important to avoid distortions linked to the generation of pressure under the effect of a thermal gradient. These distortions produce deterioration of the substrate as well as of the constructed part, liable to lead to fissuring. The form and the material of the part influence the dispersion of heat. The least favorable conditions are thicknesses of weak parts, notably thicknesses of less than 2 mm, and materials which do not disperse much heat, like titanium. The distortions are particularly concerning when the substrate is the future part, and is not a support on which the entirety of the part is being built and which will be removed at the end of the procedure.

To improve the heat dispersion, a common solution is to implement a jet of gas, a mechanical clamp, or even a heat-absorbing metal sheet known as a martyred sheet. These methods are not always sufficiently efficient.

SUMMARY

Embodiments of the disclosure aim to remedy these inconveniences, by proposing a device for additive manufacturing of a turbomachinery part by direct metal deposition onto a substrate, which notably allows for an even dispersion of the heat produced during the melting of the metal and which avoids the distortions of the substrate and the part.

An object of one or more of the embodiments of the disclosure is therefore a device for additive manufacturing of a turbomachinery part by direct metal deposition onto a substrate.

The device in accordance with one or more embodiments of the disclosure comprises: a source of metallic material; a source of energy, configured to melt metallic material issued from the source of metallic metal into molten metal; a substrate; a mold, arranged on the substrate, and equipped with at least one opening, to allow a localized deposition of molten metal onto the substrate, the mold comprising a magnetic material; and a substrate support, arranged under the substrate, the support being configured to generate an electromagnetic force allowing the mold to be drawn towards the substrate.

Thus, the mold drives the substrate against the support as the mold is magnetic. In other words, under the magnetic effect of the mold by the support, the substrate, which is sandwiched between the mold and the support, is pressed against the support in a homogeneous manner. This pressing furthers the thermal exchange and the absorption of calories by the support. The device thus leads to the furthering of cooling by improving the thermal exchange. The pressing of the substrate onto the support also enables the distortions of the substrate and thus the part to be avoided.

The substrate support can comprise an electromagnet. The substrate support is advantageously equipped with a liquid cooling circuit designed to absorb the calories produced by the molten metal.

The device can comprise an electrical power supply system for the substrate support. The electrical power supply system can comprise a solenoid.

The metallic material source can be a powder source or a welding wire source.

The energy source can be a laser beam or an electron beam.

The mold can comprise steel. The substrate support can comprise steel. The substrate can comprise steel or titanium.

The substrate can be a turbomachine casing.

An object of one or more embodiments of the disclosure is also a method for additive manufacturing of a turbomachinery part by direct metal deposition onto a substrate.

The method in accordance with one or more embodiments implements a device as described above.

The method, for example, comprises a localized deposition of molten metal onto the substrate within the opening; the localized deposition is advantageously implemented in such a way that a distance equal to, for example, 15 mm or more is maintained between the localized deposition and the rim of the opening.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 3:
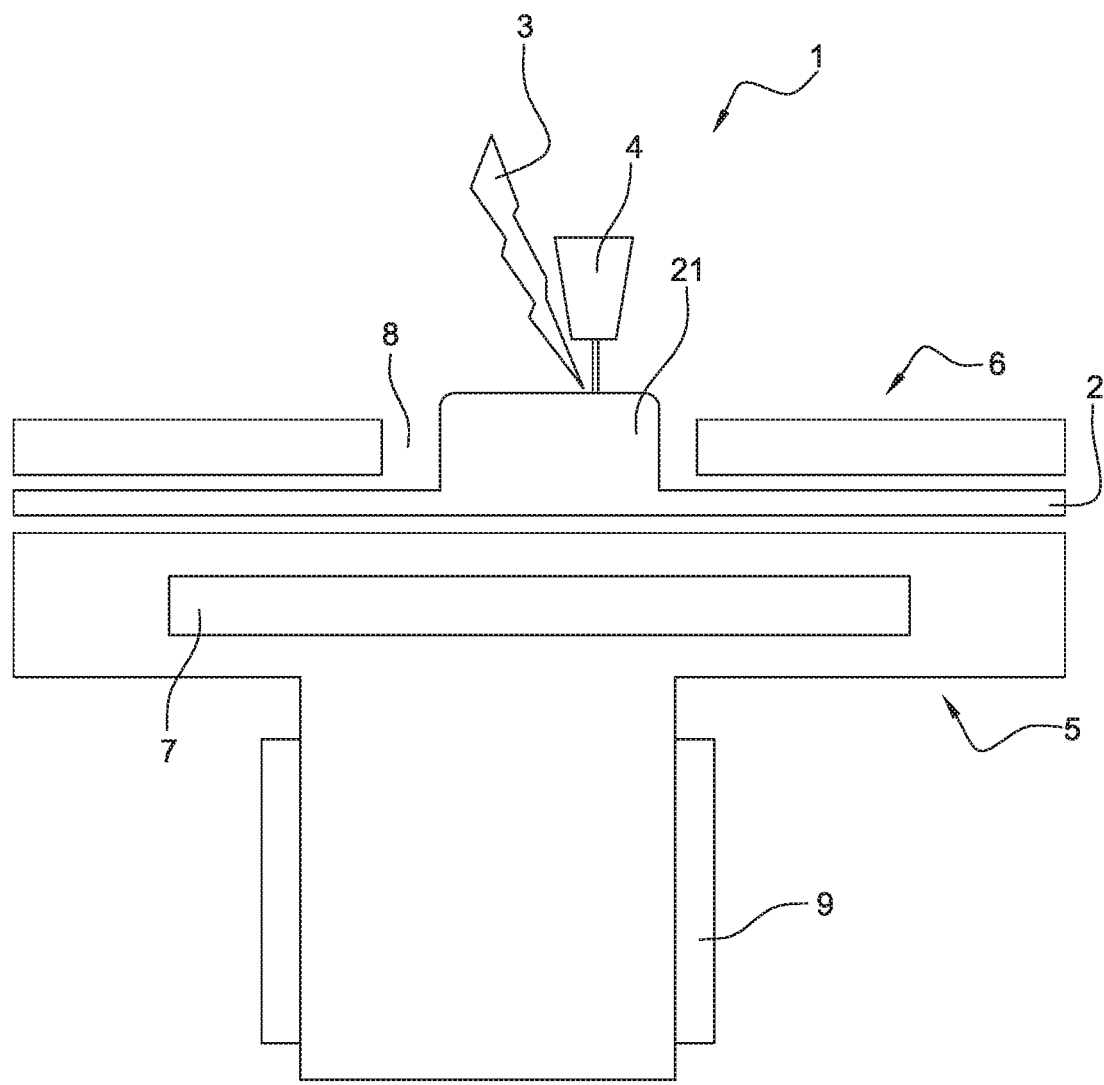
FIG. 3 schematically illustrates a device for additive manufacturing of a turbomachinery part by direct metal deposition on a substrate.

Turning now to FIG. 3, there is shown a device 1 for additive manufacturing of a turbomachinery part in accordance with one or more embodiments of the disclosure. As shown in the embodiment of FIG. 3, the device 1 comprises a substrate 2, an energy source 3, a metallic material source 4, a sheet 5 for magnetization and thermal energy dispersion, as well as a clamping mold 6.

The substrate 2 is the element upon which the turbomachinery part will be formed, by direct metal deposition onto the substrate 2. The substrate 2 can also be a support upon which the entirety of the part can be made and which can be removed at the end of the procedure. It can also be a section of the part upon which excess material can be deposited, of a complicated shape for example, to form the final part. The substrate 2 is advantageously used for the manufacturing of a turbomachinery part, like a turbomachine casing, for example. The substrate 2 can also be a casing blank, upon which one or more bossages and flanges will be constructed.

Figure 1:
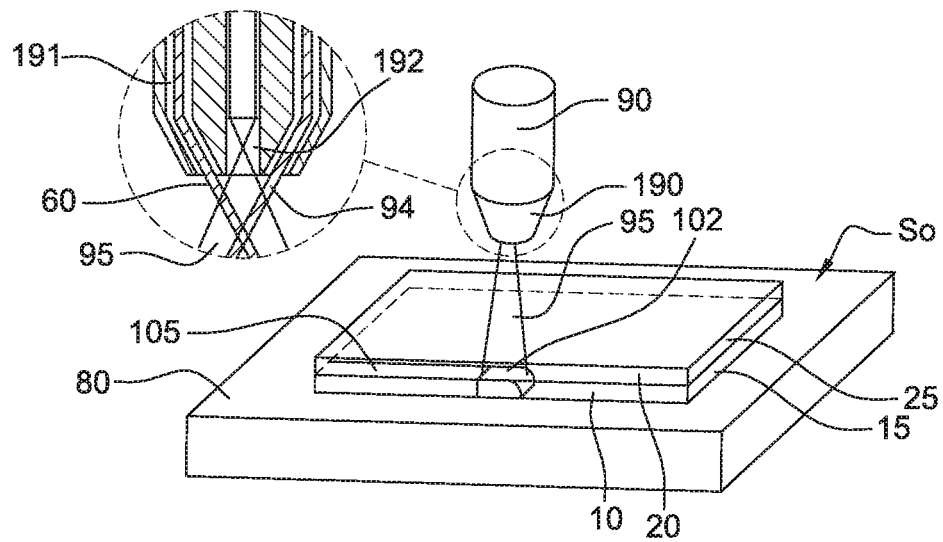
FIG. 1, as described, schematically illustrates a device for additive manufacturing of a turbomachinery part by direct metal deposition on a substrate, in accordance with the prior art.
Figure 2:
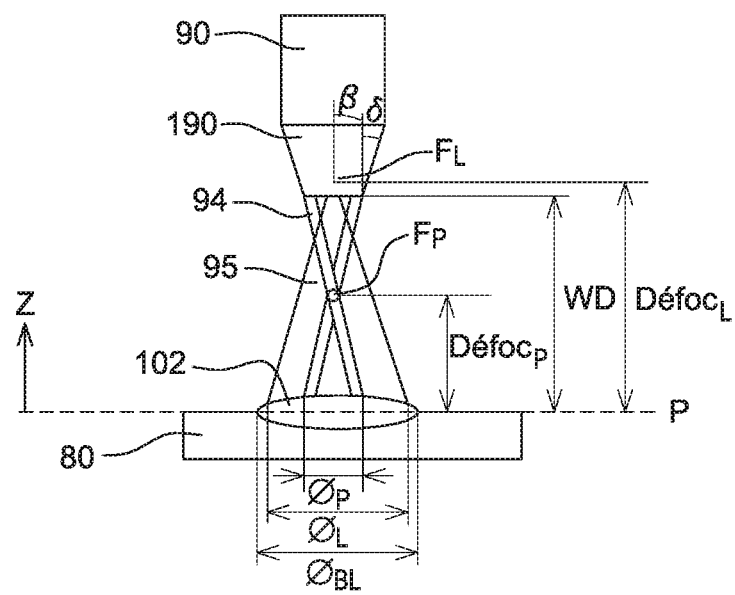
FIG. 2, as described, is a diagram showing the positioning of a high energy beam and a powder beam implemented in the device in FIG. 1.

The energy source 3 and the material source 4 are represented schematically, and can be the sources described above in relation to FIGS. 1 and 2. The energy source 3 can thus be a laser beam or an electron beam, while the material source 4 can be a powder or welding wire source. The energy source 3 enables the production of molten metal and the melt pool formed on the substrate 2 to be supplied by the energy source 3.

The substrate 2 is arranged on a sheet 5, known as a martyred sheet, which constitutes the support of the substrate 2 and which is designed to disperse the heat produced by the molten metal. The martyred sheet 5 advantageously molds to the contour of the substrate 2. To disperse the heat produced by the molten metal, it also comprises a "calorie trap" made up of a channel 7 or a network of channels. The channel 7 is traversed by a cooling liquid, typically water, with a sufficient flow to cool the martyred sheet 5. The thickness of the martyred sheet 5 is preferably higher than 10 mm, in order to absorb the maximum amount of heat.

The clamping mold 6 is arranged on the substrate 2. The mold 6 has one or more openings 8 (windows) designed to locally arrange the molten metal on the substrate 2. For example, in the case where the substrate 2 is a casing blank, the mold 6 enables one or several bossages 21 to be formed locally on the substrate 2. The form of the window 8 depends on the geometry of the part 21 to be formed on the substrate 2. A space equal to 15 mm or more can be left around the part 21 to avoid heating the mold 6 above 200° C. Too high temperatures have an unfavorable effect concerning the magnetism.

As its name indicates, the clamping mold 6 also has a clamping function 6, in a way that it can restrain the substrate 2 on the martyred sheet 5.

In accordance with one or more embodiments of the disclosure, the clamping is implemented by magnetization of the clamping mold 6 by the martyred sheet, which allows it to press the substrate 2 against the martyred sheet 5.

The martyred sheet 5 plays the role of an electromagnet. To that end, the martyred sheet 5 is made of a magnetic material, like steel, for example. An electric current traverses the martyred sheet 5 in a way which confers onto it the role of an electromagnet through the natural creation of a magnetic field. To create the magnetic field, a coil 9 is associated with the martyred sheet 5. The coil 9 can be a solenoid. A solenoid is a device composed of an electric wire regularly coiled helically in order to form a long coil. Traversed by an alternating current, it produces a magnetic field in its vicinity, and more specifically within the coil. The coil 9 can, for example, designate the external contour of the martyred sheet 5, the channel 7 being arranged under the coil 9.

The clamping mold 6 is thus also produced in a magnetic material, like steel for example. Under the effect of the electromagnet constituting the martyred sheet 5, the clamping mold 6 presses the substrate 2 against the martyred sheet 5. This form of support aims to facilitate the thermal transfer of calories generated by the melting of the metal during the additive manufacturing of the part and to make this thermal transfer homogeneous through the length of the substrate 2. In addition, the support leads to the contact of substrate 2 on the martyred sheet 5, which enables distortions of the substrate 2 and thus the final part to be avoided.

Figure 4:
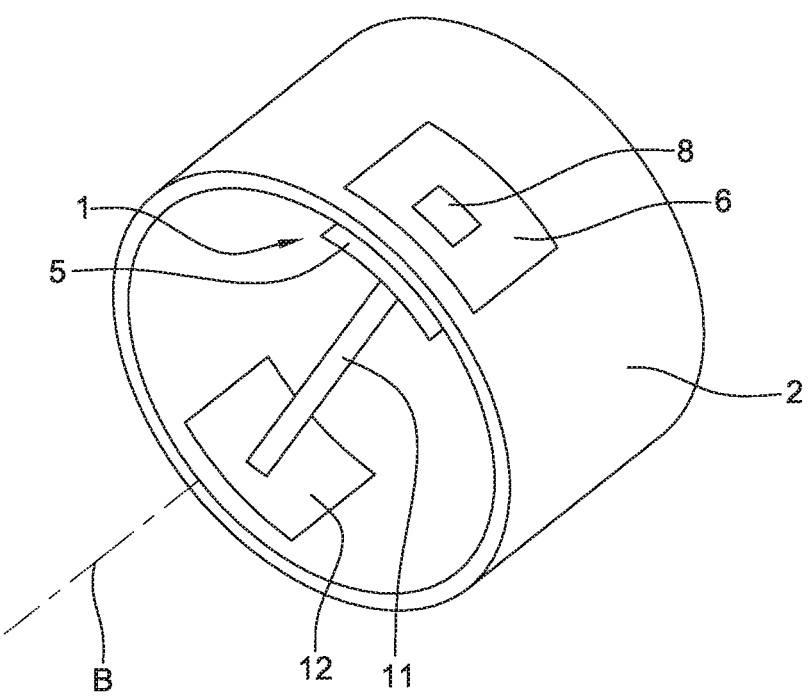
FIG. 4 schematically illustrates a turbomachine casing equipped with a device, in accordance with a first embodiment.

FIG. 4 illustrates the case where the substrate 2 is a casing blank of longitudinal axis B. In accordance with the embodiment illustrated in FIG. 4, the device 1 is supported by a radial frame 11, which extends diametrically in the casing, orthogonally to the axis B. The radial frame 11 leans against an extremity of the device 1 and against the other extremity on the support surface 12 which is in contact with the casing. The clamping mold 6 is equipped with an opening 8 which allows a bossage to be formed on the casing.

Figure 5:
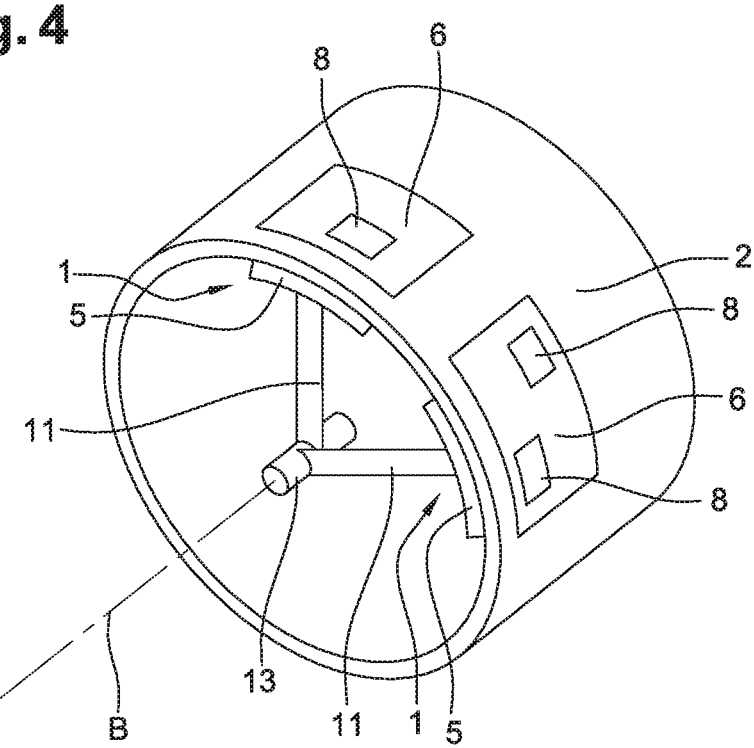
FIG. 5 schematically illustrates a turbomachine casing equipped with a device, in accordance with a second embodiment.

In a second embodiment, illustrated in FIG. 5, the substrate 2 is also a casing blank. The two devices 1 are applied onto the substrate 2. Each device 1 is connected to a central longitudinal frame 13 by a radial frame 11. The clamping mold 6 of one of the devices 1 can comprise an opening 8 while the clamping mold 6 of the other device 1 can comprise two openings 8, which allows three bossages in total to be formed on the casing. The arrangement, number and structure of the devices can of course be adapted in accordance with the bossages to be formed.

A device according to one or more embodiments of the disclosure has the advantage of being configured to implement complex forms on the substrate. It can also limit the re-manufacturing of the substrate, and can even limit, or even suppress, thermal stress relief treatment. The device can also be used to produce thin-walled parts, and to prepare the substrate by reheating it through the channel to avoid thermal shocks.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A device for the additive manufacturing of a turbomachinery part by direct metal deposition onto a substrate, wherein the device comprises:
   a source of metallic material;
   a source of energy configured to produce molten metal from the metallic material produced from the source of metallic material;
   a substrate;
   a mold arranged on the substrate and equipped with at least one opening, in order to allow a localized deposition of molten metal onto the substrate, said mold comprising a magnetic material;
   a substrate support arranged under the substrate, said support being configured to generate an electromagnetic force allowing the mold to be drawn towards the substrate;

wherein the device is supported by a radial frame which extends diametrically on a support surface of the substrate.

2. The device according to claim 1, wherein said substrate support comprises an electromagnet.

3. The device according to claim 1, wherein the substrate support is equipped with a liquid cooling circuit designed to absorb the calories produced by the molten metal.

4. The device according to claim 1, further comprising an electrical current supply system associated with the substrate support.

5. The device according to claim 4, wherein the electrical current supply system comprises a solenoid.

6. The device according to claim 1, wherein the mold comprises steel.

7. The device according to claim 1, wherein the substrate support comprises steel.

8. The device according to claim 1, wherein the substrate comprises steel or titanium.

9. The device according to claim 1, wherein the substrate is a turbomachine casing.

10. The device according to claim 9, wherein the substrate is an annular turbomachine casing.

11. A method for using the device of claim 1 in the additive manufacturing of a turbomachinery part by direct metal deposition onto a substrate.

12. The method according to claim 11, comprising depositing locally a molten metal onto the substrate within the opening, said depositing locally being implemented in a way that a distance equal to 15 mm or more is maintained between said localized deposition and the rim of the opening.

13. The device according to claim 1, wherein the substrate is sandwiched directly between the mold and the substrate support by the electromagnetic force.

14. The device according to claim 1, wherein the mold is arranged directly on the substrate and mold a contour of the substrate.

15. The device according to claim 1, wherein the substrate support is a martyred sheet having a thickness higher than 10 mm.

* * * * *